United States Patent [19]

Skidmore

[11] 3,993,292

[45] Nov. 23, 1976

[54] APPARATUS FOR COAGULATING POLYMER LATEX EMULSIONS

[75] Inventor: Richard H. Skidmore, Strafford, Pa.

[73] Assignee: W Bar E, Incorporated, Marianna, Fla.

[22] Filed: Dec. 13, 1974

[21] Appl. No.: 532,525

[52] U.S. Cl. ............................. 259/193; 159/2 E; 264/349
[51] Int. Cl.² ........................................... B29B 1/10
[58] Field of Search ........................... 259/191–193, 259/DIG. 16; 425/202–204, 208, 209; 264/102, 349; 159/2 E

[56] References Cited
UNITED STATES PATENTS

| | | | |
|---|---|---|---|
| 2,695,246 | 11/1954 | Jurgensen et al. | 264/349 X |
| 3,070,836 | 1/1963 | De Haven et al. | 264/349 X |
| 3,115,675 | 12/1963 | Tedder | 259/191 |
| 3,376,603 | 4/1968 | Colombo | 425/204 X |
| 3,700,247 | 10/1972 | Butler et al. | 259/191 X |
| 3,742,093 | 6/1973 | Skidmore | 264/349 X |
| 3,749,375 | 7/1973 | Hermann et al. | 259/192 |

Primary Examiner—Philip R. Coe

[57] ABSTRACT

Apparatus for making polymer from a polymer emulsion. An extruder is provided with a screw rotating in a barrel. Means are provided for injecting a latex emulsion under pressure, directly into the barrel, and a polymer seal is formed at the injection point. Means are provided within the barrel for coagulating the latex emulsion upstream of the seal, and for providing a polymer seal and a pressure drop downstream of the seal, into a zone in which the screws are running less than full of polymer, whereby the polymer and the water separate in the spaces between the screws. The liberated water is taken off and the coagulated polymer product is continuously extruded and may be subjected to devolatilization, countercurrent washing, pelletizing and drying.

13 Claims, 2 Drawing Figures

in my U.S. Pat. No.

APPARATUS FOR COAGULATING POLYMER LATEX EMULSIONS

BACKGROUND OF THE INVENTION

It has been previously disclosed, in my U.S. Pat. No. 3,742,093 granted June 26, 1973, that a substantially isoluble liquid may be separated by pressure as a liquid from a plasticized material containing a polymer or polymer mixture. According to this disclosure, polymeric materials are mixed, worked and conveyed by a section of a screw extruder through a high pressure region, and a liquid is removed from the mixture downstream of this high pressure region. Another high pressure region is provided downstream of the liquid removal point. The liquid which is to be removed may be one having a relatively high latent heat of vaporization, which tends to volatilize under the conditions of temperature and pressure that are present within the housing. However, in accordance with the method of the aforesaid patent, an outlet is provided for the liquid, including a valve or other means for maintaining a high pressure on the liquid, thereby maintaining the liquid in liquid form as it is forced out of the extruder, thereby preventing substantial quantities of the liquid from flashing into vapor during the removal step.

Processes in accordance with the aforementioned Skidmore U.S. Pat. No. 3,742,093 are ideally suited for the manufacture of rubber-polymer mixtures such as acrylonitrile-butadiene-styrene copolymers, for example. Dispersed particles of polymer in water may be introduced as a latex into a hot, plasticized polymer mixture and they may be mixed in such a manner as to coagulate the latex emulsion, liberating water which is retained in the liquid state and which is removed through a liquid outlet under such conditions of temperature and pressure that it remains liquid and thereby does not absorb its latent heat of vaporization from the contents of the extruder. However, it has heretofore been considered that it was necessary to introduce the latex emulsion into another polymer such as the aforementioned copolymer, for example, in order to effect the continuous coagulation of the latex. It was apparent that the presence of the polymer of polymer mixture had a significant effect in causing and in maintaining the continuous coagulation of the latex emulsion.

BRIEF DESCRIPTION OF THE INVENTION

It has now been discovered, surprisingly, that under controlled conditions and without creating a mixture of a latex and a hot, plasticized polymer within the confined housing of an extruder, a latex emulsion may be continuously and reliably coagulated when introduced as the primary and only feed into the extruder. Suitable means may be provided, such as shear means, which will be described in further detail hereinafter, to break the emulsion of this main feed within the extruder, thus liberating water and producing a polymer which is forwarded and plasticized within the interflight spaces between the screw flights of the extruder. The liberated water may be removed under such conditions of temperature and pressure as to either retain the water in liquid form without substantial volatilization or with a controlled degree of vaporization, which controls the temperature of the polymer.

DETAILED DESCRIPTION OF THE INVENTION

Figures 1, 2:
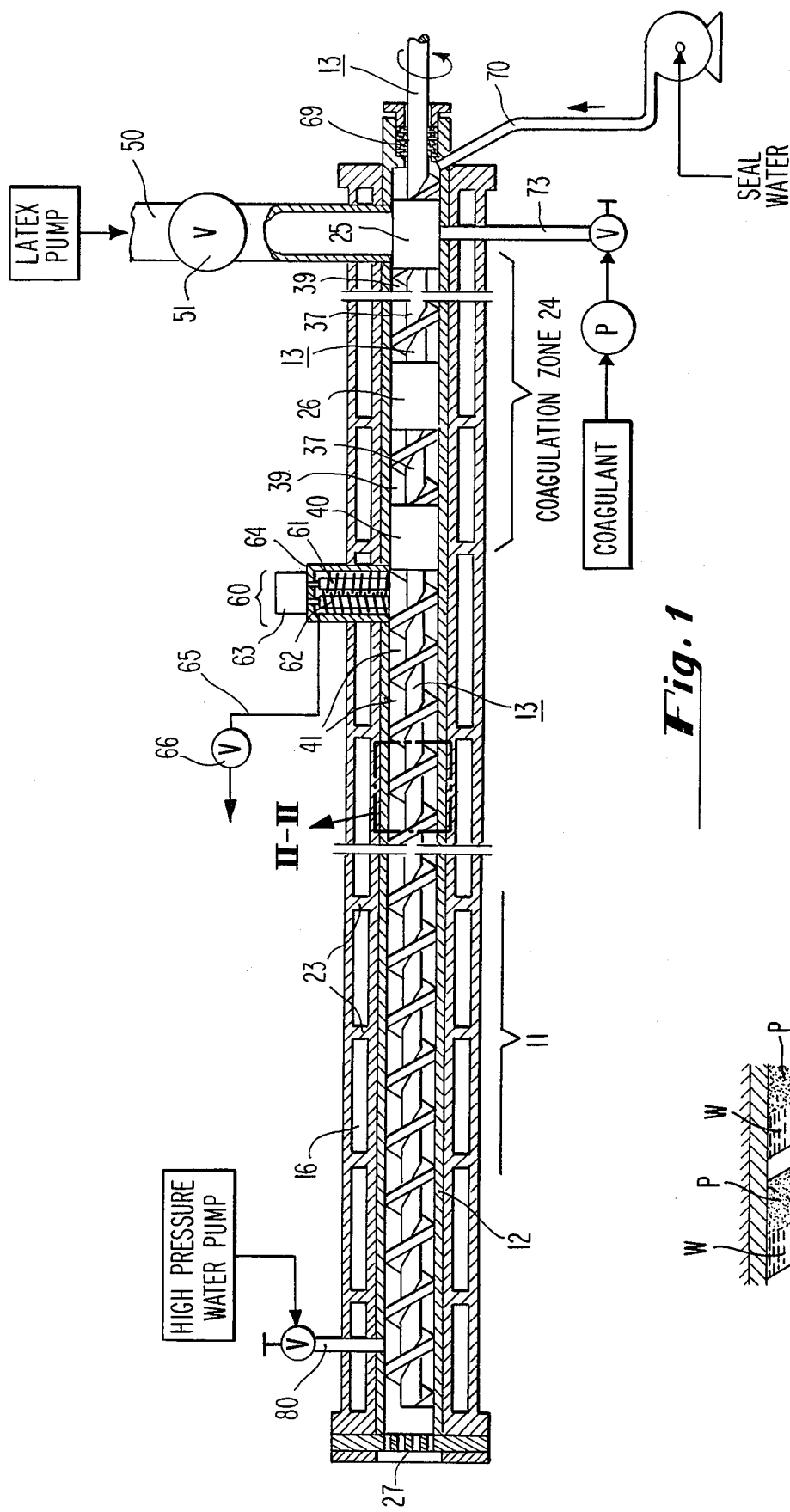

In accordance with this invention an apparatus is provided wherein an aqueous emulsion or latex is formed, without any necessity for providing a continuous stream of polymer through the coagulation zone, and is continuously fed into a pressure zone of the extruder, where the emulsion is continuously broken by shearing, or by chemical additives, or a combination of these, to separate the polymer from the water of emulsion. At least a majority of this water is separated within the extruder in the liquid state. The polymer coagulation thus formed is extruded, after separation of the water, under elevated conditions of pressure and temperature.

According to one form of the invention, a coagulant is injected into the extruder to break or to assist in breaking the emulsion, but the emulsion may also be broken by the shearing action of the screws of the extruder, as will further appear hereinafter.

Also, although not absolutely required, it is preferred to separate the water by forcing it under pressure from the extruder while maintaining it substantially in the liquid state, or by controlling the pressure and thereby the temperature by allowing only a controlled amount of liquid to vaporize.

In accordance with this invention, an apparatus is provided for making polymer from a polymer emulsion, wherein an elongated housing is provided in which one or more elongated screws are drive in rotation. If plural, these screws may be interlocking, intermeshing or substantially tangent to one another, depending upon the particular materials that are to be handled. If desired, a means may be provided for introducing an initial charge of polymer product within the housing, prior to the start-up, thus providing a suitable base upon which further coagulated polymer particles may be deposited during the emulsifying step. This is usually not necessary.

In accordance with the apparatus of this invention, means are provided for injecting a latex emulsion under pressure, without any other polymer supplied from upstream, into the housing, and preferably maintaining a mass of said polymer at the injection point. Means are also provided for further coagulating the latex emulsion downstream of the injection point, and further means are provided for causing a pressure drop in the coagulated polymer stream, whereby the screws run less than full of polymer, making the internal pressure inside the screw flights substantially equal to the pressure at the back pressure valve and controllable thereby. The polymer and the water separate from each other in the spaces between the screw flights, and the water flows out through the mechanical filter. Means are provided for removing the water from the polymer, and means are provided for continuously extruding coagulated polymer product.

In accordance with preferred embodiments of the apparatus of the invention, means may be provided for countercurrent washing and/or vapor stripping of the coagulated polymer in the aforementioned extrusion procedure. Further, as stated, means may be provided for introducing seal water into the housing at a location upstream of the injection means to keep the stuffing box clean.

In accordance with a still further preferred embodiment of this invention, the coagulated means may include a means located upstream of the pressure drop means for pumping a fluid coagulant into the housing. Also, in accordance with this invention it is desirable to provide a means for controlling the back pressure on the latex introduced into the housing.

Where countercurrent washing or stripping is used in the polymer extrusion step, it preferably includes a high pressure water pump connected into the housing, and preferably includes a fixed or variable orifice plate comprising a downstream back pressure control means for controlling the amount of water which flows downstream with the polymer. The orifice plate may, if desired, be replaced by a restrictor screw or the equivalent, but should be located close to the high pressure pump connection. The countercurrent washing means is highly conveniently served by the mechanical filter located downstream of the pressure drop means, for releasing the countercurrently flowing water as well as the water released from the coagulation step.

This invention may be better understood by reference to the following detailed description of the invention taken in conjunction with the accompanying drawings.

DRAWINGS

FIG. 1 is a vertical sectional view, partly diagrammatic in nature, and shows a typical apparatus embodying the present invention, and FIG. 2 is an enlarged sectional view of a portion of the extruder of FIG. 1 as designated by the arrows II—II, showing the condition of polymer and water in that portion.

DETAILED DESCRIPTION

Although the following description includes the use of specific terms, it will be appreciated that these terms have been used for the sake of clarity in referring to the specific form of the invention that has been selected for illustration in the drawings. By use of these terms it is not intended to limit the scope of the invention, which is defined in the appended claims.

Referring more specifically to the drawings, there is shown an extruder (preferably of the twin screw type but optionally single screw) including a housing 11 having a barrel 12 in which a feed screw 13 is driven in rotation by a motor and gears ((not shown) in a direction indicated by the arrow at the right hand end of the drawing, in such a way as to feed material disposed therein toward the left of the apparatus as illustrated.

A plurality of jacket sections 16 are provided, disposed about the barrel 12, for providing heat to material being worked within the barrel 12, such jacket sections being closed from one another by suitable annular ribs 23. It is also contemplated that the jacket sections may be used for providing cooling, when desired.

The extruder screw sections include a coagulation zone 24 having screw sections 37 provided with interflight spaces which provide high pressure regions 39, 39 in the material conveyed by the screw 13. A cylindrical restrictor 25 is provided at an upstream portion of the screw 13, preferably substantially in line with the latex feed line 50. Spaced downstream of restrictor 25 is another restrictor 26, having a function to be described in detail hereinafter, and still further downstream is another restriction 40 of the same type. Just downstream of the restrictor 40 is a relatively open flight screw section 41, providing for a sudden reduction of pressure in the polymeric material and the water as they advance beyond the restrictor member 40.

A break is shown in the figure between these screw sections 41 and the downstream portion of the apparatus to indicate that various other mixing, compounding and other sections may also be included, which are unrelated to this invention and which cannot conveniently be shown in this figure. Important details with respect to such arrangements will be described in further detail hereinafter.

The housing 11, barrel 12 and screw 13 continue in a downstream direction from the aforementioned break in the drawings, and terminate in an orifice plate 27 which is located at the extreme downstream end of the extruder. This orifice plate 27 may be replaced instead by an adjustable valve of any desired type, providing an adjustable back pressure upon the polymer mass which is present at the downstream end of the extruder, for reasons which will further become apparent hereinafter. It is highly desirable to provide such a valve in the form of a pair of concavely arranged orifice plates, adjustable with respect to one another in a manner to restrict the flow of the polymer product, thus regulating its back pressure. One highly advantageous form of such a back pressure device is shown and described in the co-pending patent application of Paul H. Rossiter and Richmond S. Parsons, Ser. No. 331,603, filed Feb. 12, 1973, now U.S. Pat. No. 3,874,835 which is a continuation-in-part of their co-pending application Ser. No. 130,586, filed Apr. 2, 1971, now abandoned, and assigned to the assignee hereof.

These concavely arranged orifice plates are highly desirably incorporated into a transversely arranged cutter referred to in the art as a "turbulator" which rapidly and efficiently cuts the polymer product into particles and conveys them efficiently away for further processing, with the aid of a processing fluid which flows in the desired direction to carry the particles quickly away from the area in which the cutters function.

Referring further to the drawings, the number 50 designates a feed pipe for the latex which is delivered under pressure by a latex pump, which may be of conventional type, as shown in FIG. 1 of the drawings. The latex may be conveniently initially stored in any latex tank, for example. As shown, the latex flow is controlled by a valve 51, and the latex flow impinges directly upon the surface of the cylindrical restrictor 25, at which point initial coagulation takes place, developing a mass of polymeric material in the immediate area of the restrictor 25.

Spaced downstream of the cylindrical restrictor 25 is a cylindrical restrictor 26, past which the coagulum is forced by the operation of the screw flights in the coagulation zone 24. The cylindrical restrictor 26 permits the passage of polymer but resists the flow of water which has been separated from the polymer. Further, located downstream of the cylindrical restrictor 26 is another cylindrical restrictor 40, which functions in essentially the same manner as the cylindrical restrictor 26 as heretofore stated.

Located just downstream of the cylindrical restrictor 40 is a vent, shown in the form of a mechanical filter 60 having a pair of rotating screws 61 and 62 driven by motors contained within the housing 63. The mechanical filter 60 is housed in a pipe 64 the lower end of which extends through the barrel 12 and is in open communication with the interflight spaces 41 of the screw 13. At its upper end the housing 64 is provided with a vent line 65 which is connected to a vacuum aspirator line 66.

The number 70 designates an inlet pipe for the introduction of seal water which may be introduced, at a pressure essentially equal to that of the latex in the area 13, under the influence of a pump, as shown in FIG. 1. This seal water inlet pipe 70 is located upstream of the pipe 50 through which the latex starting material is introduced.

The number 73 designates a separate inlet line for coagulant, which is introduced as a fluid through a coagulant pump P and a valve V as shown in FIG. 1. This coagulant inlet line 73 is located substantially in line with the latex inlet line 50 and with the restricting cylinder 25.

The number 80 designates a high pressure water inlet line, providing for the introduction of high pressure water from a pump, as indicated in the drawings. This inlet line 80 is located upstream of the orifice plate 27 which is located at the downstream end of the extruder, and is spaced downstream of the mechanical filter 60 and of the restricting cylinders 40, 26 and 25.

OPERATION

The operation of the apparatus in accordance with this invention will now be understood.

With the screw rotating and with the temperatures of the apparatus brought to the desired levels, the valve 51 of the latex inlet pipe 50 is opened, and the latex impinges upon the restricting cylinder 25. Concurrently, the valve in line 73 is opened, and the associated pump causes the coagulant to flow against the cylindrical restrictor 25 under pressure. The net result is the immediate coagulation of latex around the circumference of the cylindrical restrictor 25, whereupon polymer, liberated water and excess latex flow downstream, from right to left as viewed in FIG. 1 of the drawings. Coagulation continues as the material flows downstream, whereupon it encounters the cylindrical restrictor 26, which functions as a barrier to the flow of at least some of the water but more readily permits the flow of polymer downstream, creating a separation of the water and the polymer. As the material continues to flow downstream further, it encounters still another cylindrical restrictor 40, which functions in essentially the same manner, and which of course creates a polymer seal around the periphery of the cylindrical restrictor 40.

Concurrently with this, the seal water pump provides seal water through the line 70, at a location slightly upstream of the cylindrical restrictor 25, at a pressure which is essentially equal to the pressure just downstream of the cylindrical restrictor 25. This serves to prevent latex or polymer from entering into the packing 69 at the end of the shaft 13.

With respect to the nature of the coagulant, suitable chemical additives for coagulation of latex emulsions are well known in the art, and are not of themselves considered to be part of this invention. Particular individual coagulating solutions and combinations may readily be selected by those skilled in the art for use in conjunction with the particular polymer emulsion, its processing conditions, concentration, etc., as is well known in the art relating to latex coagulation.

Polymeric material (or emulsion) flowing past the restrictor 40 is suddenly subjected to a drop in pressure in the area beneath the mechanical filter 60, just downstream of the restictor 40. This sudden reduction of pressure results in interflight spaces 41 that are running less than full of polymer, thereby liberating water in the liquid state and concurrently liberating polymer which flows further in a downstream direction by the rotation of the screw 13. However, because of the back pressure created by the orifice plate 27 which is located at the downstream end of the extruder, and because the spaces provided by the orifice plate 27 become filled with polymer, the orifice plate 27 forms a pressure seal which blocks off the movement of water downstream beyond the orifice plate 27, thus confining the liberated water within the interflight spaces between the screws 13. This water accordingly flows concurrently or upstream, and makes its way out through the vent pipe or mechanical filter 60.

The revolving screws 61, 62 of the mechanical filter 60 permit the flow of liquid through the pipe 64 but catch all entrained solid particles and prevent them from leaving the system.

FIG. 2 is an enlarged sectional view showing that the polymer and the water separate from each other in the area downstream of the cylindrical restrictor 40, in which downstream section the interflight spaces 41 are running less full of polymer. It will be observed that the polymer collects on the driving face of each screw (the surface facing in the downstream direction) whereas the water W collects in the area adjacent the faces of the screws which are facing upstream. Accordingly, the screws continuously move the polymer in a downstream direction, while the water is permitted to flow countercurrently with respect to the polymer, and to be ejected out through the pipe 64.

Where desired, the high pressure water pump connected to the inlet pipe 80 may additionally be used, thus creating a countercurrent flow of any desired volume of high pressure water. All of such countercurrently flowing water passes out through the pipe 64 or the mechanical filter 60 and mingles with the water that has been liberated from the latex emulsion as heretofore described. Any desired quantity of preheated high pressure water can be used, by introduction through the pipe 80, without significantly altering the thermal economy of the apparatus. The water that is recirculated in this manner may be passed through a heat exchanger if desired. Further, any quantities of such high pressure water may be used for countercurrent washing in accordance with this invention, with resulting improvement of the quality of the polymer product, and it may be used in a closed system with high beneficial ecological results.

It is important and advantageous in accordance with this invention that the initial feed is a latex emulsion which does not require the pressure of any other polymeric material fed upstream. Heretofore, it has not been considered possible to coagulate a latex emulsion by direct action within an extruder. As described in my aforementioned U.S. Pat. No. 3,742,093, an emulsion has been introduced into the polymer which separates from the liquid as by breaking the emulsion, under the conditions of pressure, temperature and shear that exist within the extruder. Such an operation has been used typically by introducing an aqueous polymer suspension or emulsion which is normally stable at room temperature but which is unstable and breaks under the conditions of pressure, temperature and shear existing in the extruder, thus liberating the solid component from the water in the extruder, followed by mechanical admixing of the liberated solid component with a polymer or a mixture of polymers. In accordance with this invention no such additional polymer stream is required, and it has been discovered that the feed material may be latex which does not require any other polymeric material to be fed upstream, and which latex may be broken in and of itself.

It will be appreciated that various modifications may be made in accordance with this invention. For example, in some instances it may be desirable to preheat the water which is introduced through the line 80, either in the heat exchanger illustrated in the drawings or otherwise. When the water is preheated as indicated herein, the water is initially brought to the same temperature and pressure at which it is intended to be discharged, thus resulting in zero loss of heat in the process due to the introduction and removal of the countercurrently flowing washing water. The quantity or such water may be varied widely without affecting the process, when such water has been preheated to the same temperature as the polymeric material at the discharge or orifice plate 27.

Various other modifications may be made in this invention, including the substitution of equivalent elements and steps, the reversal of parts and of method steps, and the use of certain features independently of the use of other features, all without departing from the spirit and scope of this invention as defined in the appended claims.

The following is claimed:

1. In an apparatus for making rubber from a rubber emulsion, wherein an elongated housing is provided in which an elongated worm is driven in rotation, the combination which comprises:
    a. means for injecting a latex emulsion under pressure into said housing,
    b. means forming a seal of polymer downstream of said injection means (a),
    c. means for coagulating said latex emulsion upstream of said seal-forming means (b),
    d. means for removing water downstream of said seal-forming means (b), said means maintaining at least a majority of said water in the liquid state,
    e. means for continuously extruding coagulated rubber product downstream of said seal-forming means (b)
    f. with screw flights running less than full of polymer, and the polymer and the water separate in between said screws, for removal through the means (d).

2. The apparatus defined in claim 1, wherein means are provided for countercurrent washing of said coagulated rubber with water, downstream of said coagulating means (c).

3. The apparatus defined in claim 2, wherein the countercurrent washing means includes a high pressure pump connected into said housing, and wherein there is provided means including a back-pressure control means for valving the flow of said coagulated latex located downstream of and closely adjacent to said high pressure pump connection.

4. The apparatus defined in claim 2, wherein said countercurrent washing means includes a mechanical filter downstream of said seal-forming means (b) for separating fines while releasing the countercurrently flowing water.

5. The apparatus defined in claim 2, wherein means are provided for straining the released countercurrently flowing water.

6. The apparatus defined in claim 2, wherein means are provided for extracting heat from the countercurrently flowing water.

7. The apparatus defined in claim 1, wherein means are provided for introducing seal water into said housing at a location upstream of said injection means (a) said seal water preventing latex or polymer from moving upstream from injection means (a).

8. The apparatus defined in claim 1, wherein the coagulating means (c) includes a means located upstream of sealing means (b) for pumping a fluid coagulant into said housing substantially in line with said injection means (a) and sealing means (b).

9. The apparatus defined in claim 1, wherein means are provided for controlling the flow of said latex into said housing.

10. The apparatus defined in claim 1 which further includes means for adjusting the pressure to maintain the majority of water in the liquid state.

11. The apparatus defined in claim 1, wherein means are provided for controlling said means (d) for removing water downstream of said seal-forming means (b) said means consisting of applying controlled pressure downstream of said seal forming means (b) for removing said water.

12. The apparatus defined in claim 1, wherein a means (f) is provided for controlling the pressure of the coagulated material in the area downstream of said seal-forming means (b).

13. The apparatus defined in claim 1, wherein a means is provided for removing water under controlled pressure downstream of said seal-forming means (b), and wherein a means (f) is provided for controlling the pressure of the coagulated material in the area downstream of said seal-forming means (b).

* * * * *